(12) United States Patent
Nguyen et al.

(10) Patent No.: US 6,901,364 B2
(45) Date of Patent: May 31, 2005

(54) FOCUSED LANGUAGE MODELS FOR IMPROVED SPEECH INPUT OF STRUCTURED DOCUMENTS

(75) Inventors: Patrick Nguyen, Santa Barbara, CA (US); Luca Rigazio, Santa Barbara, CA (US); Jean-Claude Junqua, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 560 days.

(21) Appl. No.: 09/951,093

(22) Filed: Sep. 13, 2001

(65) Prior Publication Data

US 2003/0050778 A1 Mar. 13, 2003

(51) Int. Cl.[7] .......................... G10L 15/26; G10L 21/00; G06F 17/20
(52) U.S. Cl. .................... 704/235; 704/270.1; 704/275; 704/1
(58) Field of Search ................................ 704/235, 251, 704/275

(56) References Cited

U.S. PATENT DOCUMENTS

| | | | |
|---|---|---|---|
| 5,444,617 A | | 8/1995 | Merialdo |
| 5,613,036 A | | 3/1997 | Strong |
| 5,745,776 A | * | 4/1998 | Sheppard, II ............... 715/532 |
| 6,188,976 B1 | | 2/2001 | Ramaswamy et al. |
| 6,308,151 B1 | * | 10/2001 | Smith .......................... 704/235 |
| 6,463,413 B1 | * | 10/2002 | Applebaum et al. ........ 704/256 |
| 6,507,643 B1 | * | 1/2003 | Groner ..................... 379/88.14 |
| 6,532,446 B1 | * | 3/2003 | King ........................ 704/270.1 |
| 6,687,671 B2 | * | 2/2004 | Gudorf et al. ............... 704/235 |
| 6,718,368 B1 | * | 4/2004 | Ayyadurai ................... 709/206 |
| 2002/0013692 A1 | * | 1/2002 | Chandhok ....................... 704/1 |
| 2002/0073117 A1 | * | 6/2002 | Newman ..................... 707/513 |
| 2002/0140744 A1 | * | 10/2002 | Kanevsky .................... 345/839 |

FOREIGN PATENT DOCUMENTS

| | | |
|---|---|---|
| WO | WO 00/58945 | 10/2000 |
| WO | WO 01/01391 A1 | 1/2001 |

OTHER PUBLICATIONS

Saran, Cliff. "Speech Interface shows the true potential of handheld computers", Computer Weekly, Feb. 24, 2000.*
Junqua, Jean–Claude & Haton, Jean–Paul, Robustness in Automatic Speech Recognition Fundamentals and Application, (1996), ch. 11.4, pp. 356–360.

* cited by examiner

Primary Examiner—Tālivaldis Ivars Šmits
Assistant Examiner—Matthew J Sked
(74) Attorney, Agent, or Firm—Harness, Dickey & Pierce, PLC

(57) ABSTRACT

An e-mail message process is provided for use with a personal digital assistant which allows for the use of input speech messaging which is converted to text using a focused language model which is downloaded by a cellular phone connection to an Internet server which provides the focused language model based upon a topic for the intended e-mail message. The text that is generated from the input speech method can be summarized by the e-mail message processor and can be edited by the user. The generated e-mail message can then be transmitted again via cellular connection to an Internet e-mail server for transmitting the e-mail message to a recipient.

32 Claims, 6 Drawing Sheets

FOCUSED LANGUAGE MODELS FOR IMPROVED SPEECH INPUT OF STRUCTURED DOCUMENTS

FIELD OF THE INVENTION

The present invention relates to speech recognition systems, and more particularly, focused language models for improved speech input and the use thereof for generating e-mail and text messages.

DISCUSSION

The merging of functionality among cellular phones, personal digital assistants and other handheld devices is making it possible to access the Internet from potentially any location. One of the most popular Internet applications is still the classical e-mail. At the same time, the short message service (SMS) is very popular for use with cellular phones. Both applications provide an instant messaging service which can require a substantial amount of text to be entered. Such text entry can be cumbersome when using a personal digital assistant or cellular phone system. Accordingly, it is desirable to provide a personal digital assistant having e-mail capabilities which utilizes voice input for conversion to text messaging.

Today's large vocabulary speech recognition systems rely heavily on language models that provide a statistical representation of the language estimated on corpora ranging from tens to hundreds of millions of words. To enhance the performance, language models may be restricted to narrow domains. Such systems are disclosed in U.S. Pat. No. 5,444,617 to Merialdo entitled METHOD AND APPARATUS FOR ADAPTIVELY GENERATING A FIELD OF APPLICATION DEPENDENT LANGUAGE MODELS FOR USE IN INTELLIGENT SYSTEMS, and U.S. Pat. No. 6,188,976 to Ramaswamy et al entitled APPARATUS AND METHOD FOR BUILDING DOMAIN-SPECIFIC LANGUAGE MODELS.

In addition, mobile devices, such as cellular phones and personal digital assistants, typically provide small display screens, so the amount of information that can be displayed is greatly limited. Accordingly, it is desirable to present the user with a summary of a text message, both incoming and outgoing.

Accordingly, the present invention provides a message processing system that utilizes focused language models for improved speech input for converting the speech into text messages. The invention is thus well suited for use with handheld devices, such as cellular telephones and wireless personal digital assistants. The invention makes it easy to send e-mail and other instant messages over a cellular phone or other wireless connection. According to one aspect of the invention, text messages are summarized by the system so that they can be displayed and edited by the user on the comparatively small screen of the device.

According to another aspect of present invention, a speech recognition processor is provided for processing input speech and converting the input speech to text. The processor allows a user to utter spoken messages which are then converted to text by a speech recognition module or section that uses a focused language model to increase the speed and accuracy of the recognition process. The focused language model is derived by the processor recognizing the topic of the intended message and retrieving a language model from an Internet server for use by the voice recognition section. The topic of the outgoing message can be derived from a received e-mail message to which the outgoing e-mail message is a reply, or the topic can be entered by the user. Once the uttered speech message is converted to text, the text message can be edited by the user and/or summarized by the processor to shorten the message for display on a screen of a personal digital assistant. The text message may be provided in the form of an e-mail template which can them be transmitted by wireless or cellular connection to an Internet server for delivery to a recipient.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
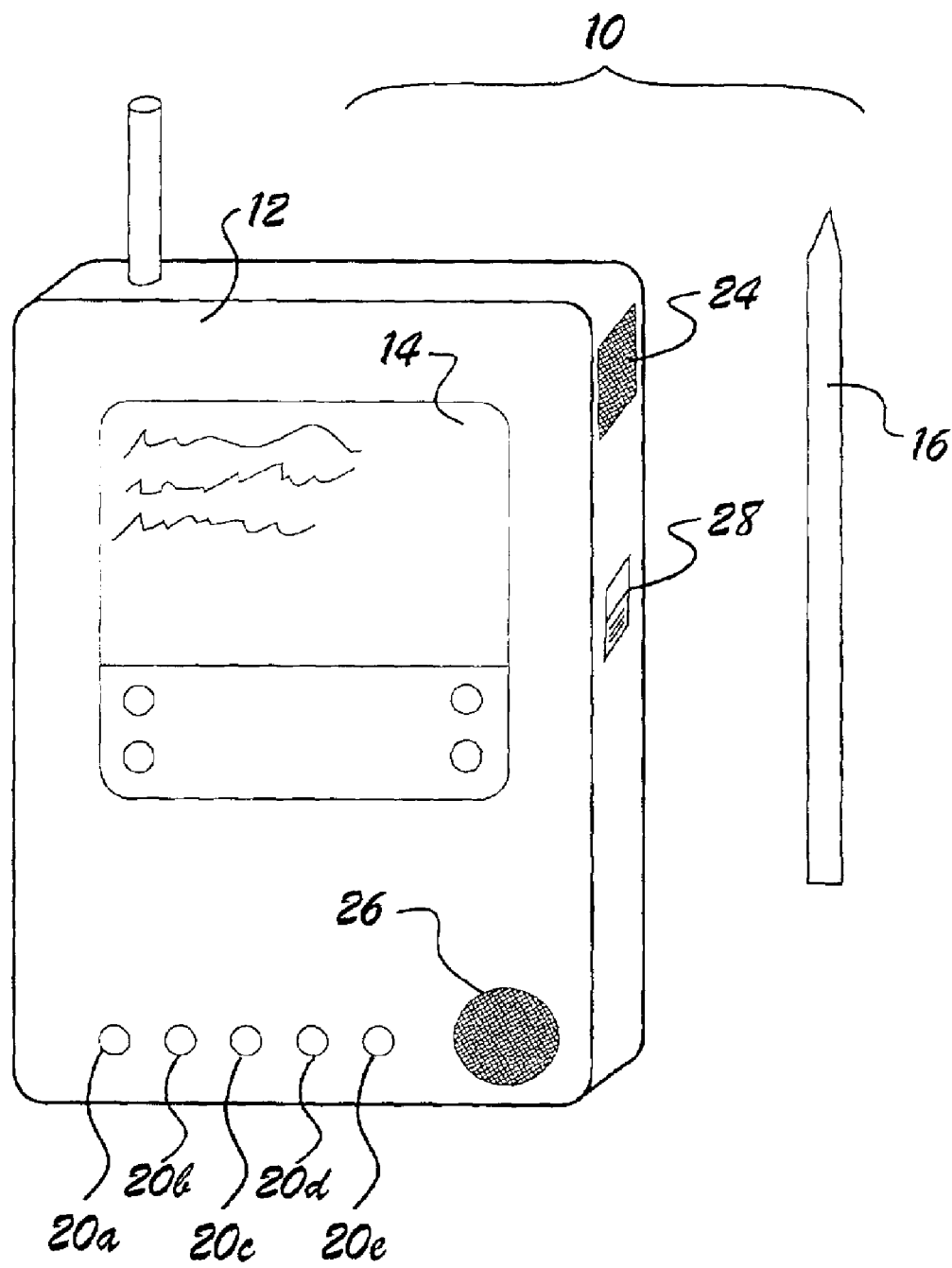
FIG. 1 is a perspective view of an exemplary personal digital assistant adapted for use with the present invention.

With reference to the accompanying figures, the e-mail processing system using focused language models for improved speech input will now be described. As shown in FIG. 1, a personal digital assistant 10 is shown generally including a housing 12 which is compact and capable of generally being held in a user's hand. The personal digital assistant 10 includes a display screen 14 on a front surface of the housing 12. The display screen 14 is preferably of the type which can be activated by a touch input either using an operator's finger or a stylus 16 for accessing information, data, and programs which are stored within the processor 18 (best illustrated in FIG. 2) of the personal digital assistant 10. The personal digital assistant 10 also includes a plurality of input buttons 20a–20e which can be selectively programmed to allow a user to pull up different applications such as address and phone lists, calendars, calculators, notes, and other application functions.

Figure 2:
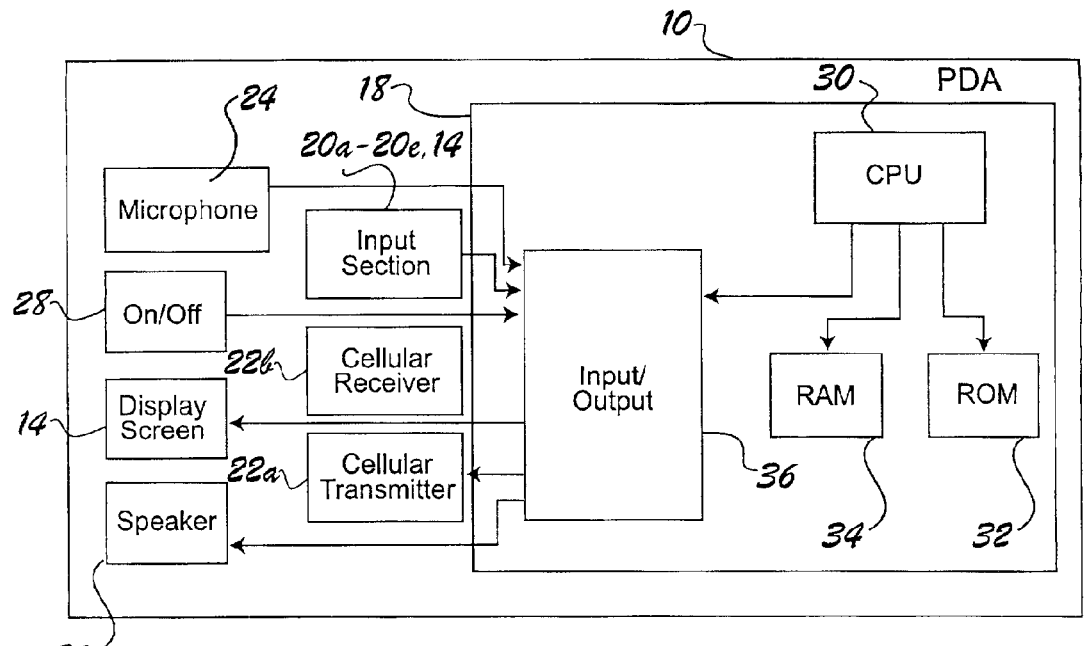
FIG. 2 is a block diagram of a computer implemented speech recognition system for generating e-mail messages based upon focused language models which are accessed via a cellular phone connection and Internet server.

As shown in FIG. 2, the personal digital assistant 10 is employed with a computer system 18 and includes a cell phone transmitter 22a and cell phone receiver 22b, touch keypad inputs such as buttons 20a–20e and touch screen 14

(see FIG. 1). A microphone 24 is provided for the user's input speech and a speaker 26 is optionally provided for the user to play back the recorded speech. An on/off switch 28 can be provided for activating the personal digital assistant 10. Other known methods of activating the personal digital assistant 10, such as opening a cover, could also be employed.

The computer system 18 includes a microcomputer, a digital signal processor, or a similar device which has a combination of a CPU 30, a ROM 32, a RAM 34, and an input/output section 36. The input/output section 36 receives inputs from on/off switch 28, keypad members 20a–20e, touch screen 14, the cellular receiver 22b, and microphone 24. The input/output section 36 provides output to the display screen 14, cellular transmitter 22a and speaker 26. A rechargeable battery (not shown) and/or an AC adapter are used for supplying electrical power to the personal digital assistant.

Figure 3:
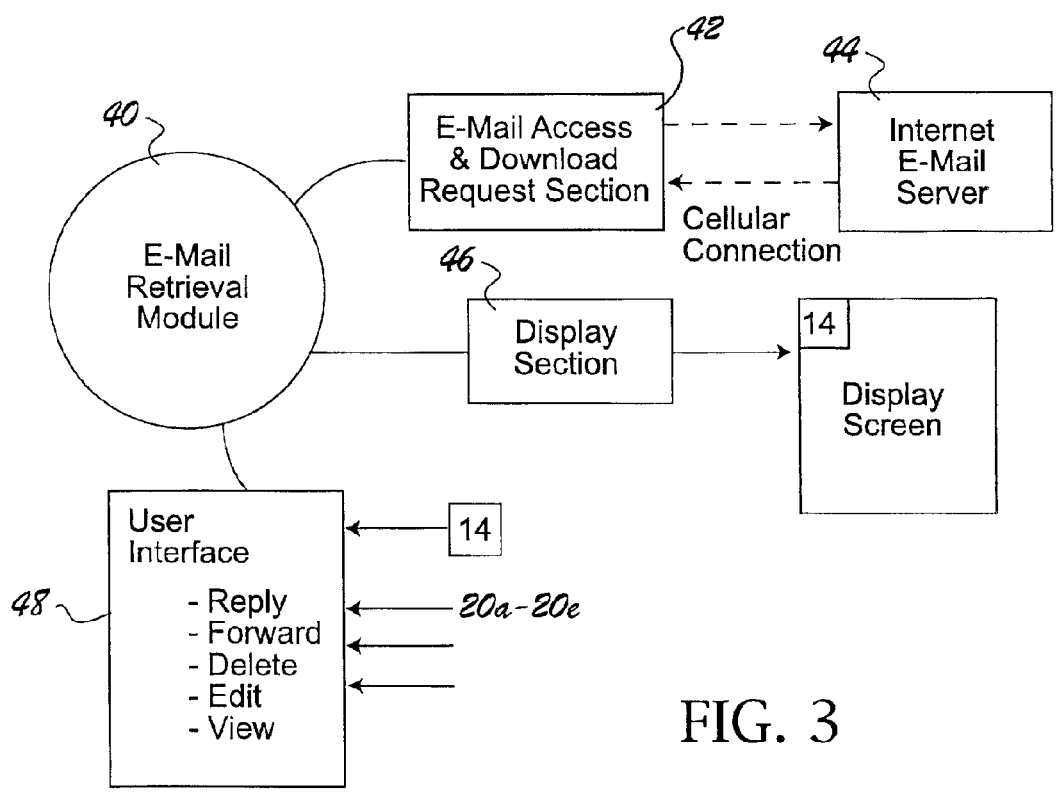
FIG. 3 is a dataflow diagram of an e-mail retrieval module for use with an e-mail processor for a personal digital assistant according to the principles of the present invention.

With reference to FIG. 3, the e-mail retrieval module 40 of the computer system 18 will now be described. The e-mail retrieval module 40 includes an e-mail access and download request section 42 which is activated by a user selecting the e-mail retrieval application using one of the interface input devices including keypad members 20a–20e or touch screen 14. In other words, the user selects e-mail retrieval either by pressing one of the buttons 20a–20e, or by selecting an icon which is displayed on the screen 14. Once activated, the e-mail access and download request section 42 initiates a cellular connection via the cellular transmitter 22a to access an Internet e-mail server 44 by a cellular phone connection. Once connected, the e-mail access and download request section 42 downloads the user's e-mail to the computer system 18 which is then stored in RAM 34. The user's e-mail can be displayed in the same manner as commercially known e-mail systems by activation of a user interface which allows the user to perform common functions such as "view," "reply," "forward," and "delete" with respect to the downloaded e-mail messages. The user interface module 48 allows the user to decide which functions are to be performed and the selected functions can then be displayed as dictated by the display section 46 of the e-mail retrieval module 40 which includes the format in which each type of user interface will be displayed on the display screen 14 of the personal digital assistant 10.

Figure 4:
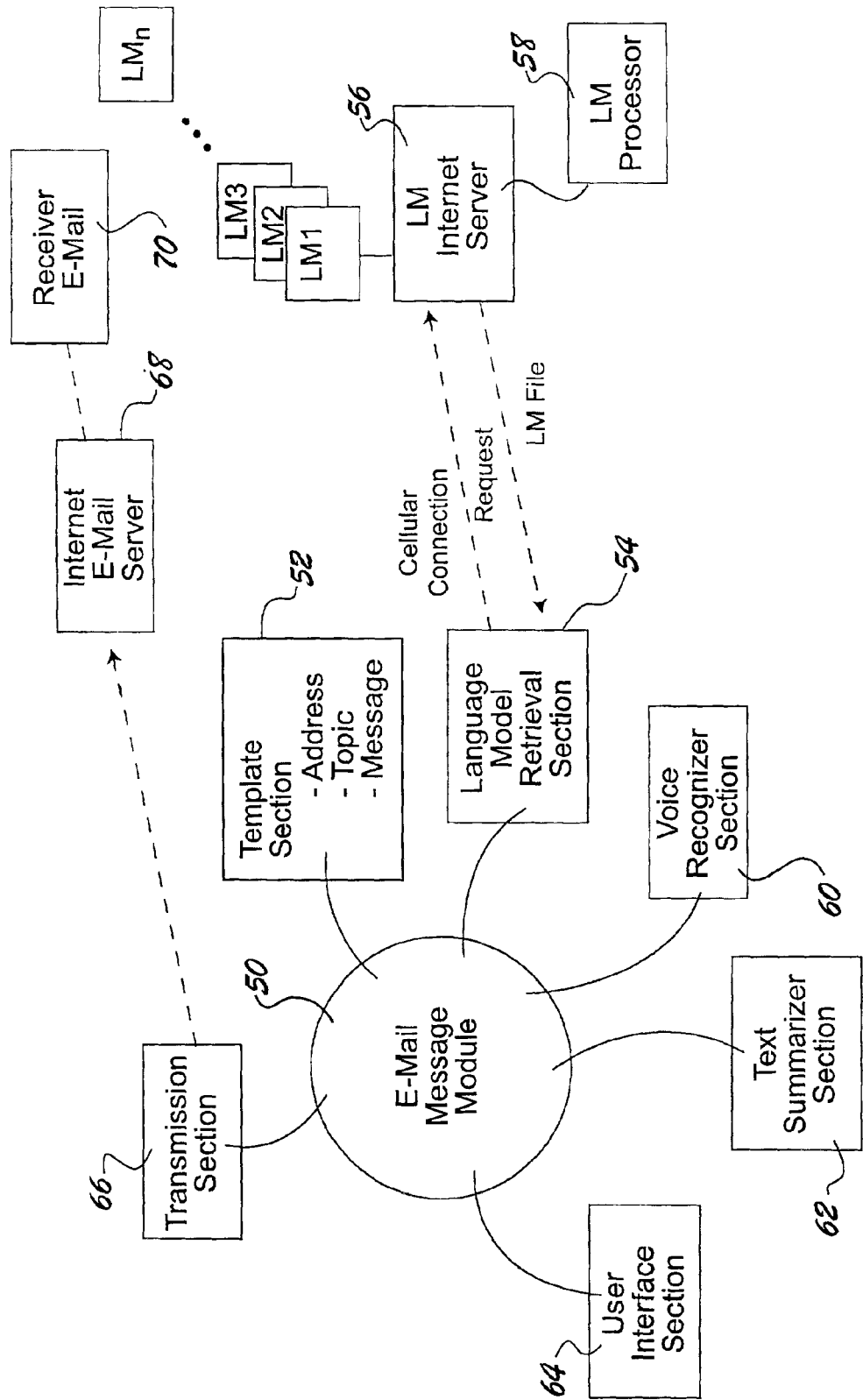
FIG. 4 is a dataflow diagram of an e-mail message module for use with an e-mail processor of a personal digital assistant according to the principles of the present invention.

With reference to FIG. 4, the e-mail message module 50 will now be described. The e-mail message module 50 allows a user of the personal digital assistant 10 to prepare an e-mail message including text messages from voice input using a focused language model which is retrieved from an Internet server by a cellular phone connection. In particular, the e-mail message module 50 can be activated by a user of the personal digital assistant 10 selecting either an icon from an applications menu displayed on the screen 14 or by selecting one of the preprogrammed push buttons 20a–20e which is programmed for activating the e-mail message module 50. In addition, the e-mail message module 50 is automatically activated by selecting "reply" or "forward" when in the e-mail retrieval operating mode.

Once initiated, the e-mail message module 50 includes a template section 52 which structures the outgoing e-mail message through a template to improve recognition. The template section 52 allows the user to input the e-mail address of the intended receiver, a topic for the message, and an initial message blank for the text message to be sent. As will be discussed in greater detail herein, the template section prompts the user to input the address and topic for the outgoing e-mail message. For "reply" e-mail messages, the topic is derived from the received message.

The topic may be derived from the received message in a variety of ways. One presently preferred way is to parse the received message into syntactic units, such as paragraphs, sentences and words. The parsed words are then compared to a database of "noise" words, that is, words that do not convey strong topical meaning (such as, "the." "an," "few," "many" "very truly yours."). The noise words are assigned a low weight, or completely excluded from further analysis. The remaining words are then weighted based on their usage within the message. At the sentence level, individual words may be weighted based on their respective parts of speech. Nouns are given a high weight. Active verbs are given a medium weight. Passive verbs, adjectives and adverbs are given a still lower weight. Then by ranking words according to weight, the most "important" words (those with the higher weights) are used as keywords for identifying the topic of the message. In addition, if desired, sentence position within a paragraph can also be taken into account. Many paragraphs begin with a topic sentence that introduces the subject of that paragraph. Thus words in the first (and second) sentence of each paragraph can be given additional weight, to emphasize their effect on determining the topic of the message.

As an alternative to deriving the topic of a message from its text, the system can also include topic selection by user entry. One convenient mode of providing this functionality is through a pull down list or topic entry field that the user uses to supply a topic. If desired, speech input can be used to supply the topic.

Based upon the entered topic, a language module retrieval section 54 initiates a cellular connection via the cellular transmitter 22a to access a language model Internet server 56 and provide a request for a language model related to the identified topic. The language model Internet server 56 includes language models (LM1–LMn) which can be categorized by topic. In addition, the language model Internet server is also provided with a language model processor 58 which is capable of generating language models for topics which are not prestored. The language model processor 58 can also access the user's own prior sent and/or received e-mail messages as part of a database for generating a language model. Since the amount of processing resources required for generating a language model is generally more than available in a personal digital assistant, the use of the server solves this problem.

A major source of information for speech recognition is the language model which is utilized to introduce constraints to limit the number of sequences which are actually considered during the recognition process. Several types of language models have been used in speech recognition software with an emphasis on purely statistical and purely syntactical models. The goal of a language model is to predict words in a given context. The use of language models is discussed in the book ROBUSTNESS IN AUTOMATIC SPEECH RECOGNITION FUNDAMENTALS AND APPLICATION, by Jean-Claude Junqua and Jean-Paul Haton (chapter 11.4, p. 356–360)© 1996 which is herein incorporated by reference. In addition, U.S. Pat. No. 5,444,617 to Merialdo, entitled METHOD AND APPARATUS FOR ADAPTIVELY GENERATING FIELD OF APPLICATION DEPENDANT LANGUAGE MODELS FOR USE IN INTELLIGENT SYSTEMS, and U.S. Pat. No. 6,188,976 to Ramaswamy et al, entitled APPARATUS AND METHOD FOR BUILDING DOMAIN-SPECIFIC LANGUAGE MODELS (each of which is herein incorporated by reference) each disclose language modeling processors for generating focused language models for speech recognition systems.

Once a focused language model file is retrieved by the language model retrieval section 54, the focused language model is provided to a voice recognizer section 60 of the e-mail message module 50. Once provided with the focused language model file, the voice recognition section 60 is utilized to convert a voice message, that is input by the user, to text. The voice message that is input by the user is input via the microphone 24 mounted on the housing of the personal digital assistant 10. The recorded speech message is processed by a transducer and is provided to the computer system 18 via the input/output section 36 and can be stored in RAM 34 until processed by the voice recognizer section 60 of the e-mail message module 50. The voice recognizer section 60 can utilize known voice recognition software for converting the input speech to text utilizing the retrieved focused language model as is known in the art.

Once the voice message is converted to text, a text summarizer section 62 can be implemented for summarizing the converted text in order to reduce the amount of text that is to be displayed on the display screen 14 of the personal digital assistant 10. Because the display screen 14 is relatively small, the text summarizer section 62 allows the processor 18 to reduce the size of the text message. Such a text summarizing system is currently utilized as a tool bar selection as AutoSummarize in MICROSOFT WORD which allows a user to automatically summarize the key points in the text of a document. Once the e-mail message has been generated by the template section 52, including the address, topic, and text message (converted from speech input), a user interface section 64 can be employed to allow the user to edit the text message. The text editing functions can include, but are not limited to, adding or deleting text, punctuation, cut, copy, paste, and selecting additional auto-summarizing options to allow the user to either further summarize the text message or unsummarize the message. Once the e-mail message is complete, a transmission section 66 of the e-mail message module 50 can be utilized to transmit the e-mail message over a cellular connection to an Internet e-mail server 68 which then transmits the e-mail message to the receiver's e-mail server based upon the address from the e-mail template.

Figure 5A:
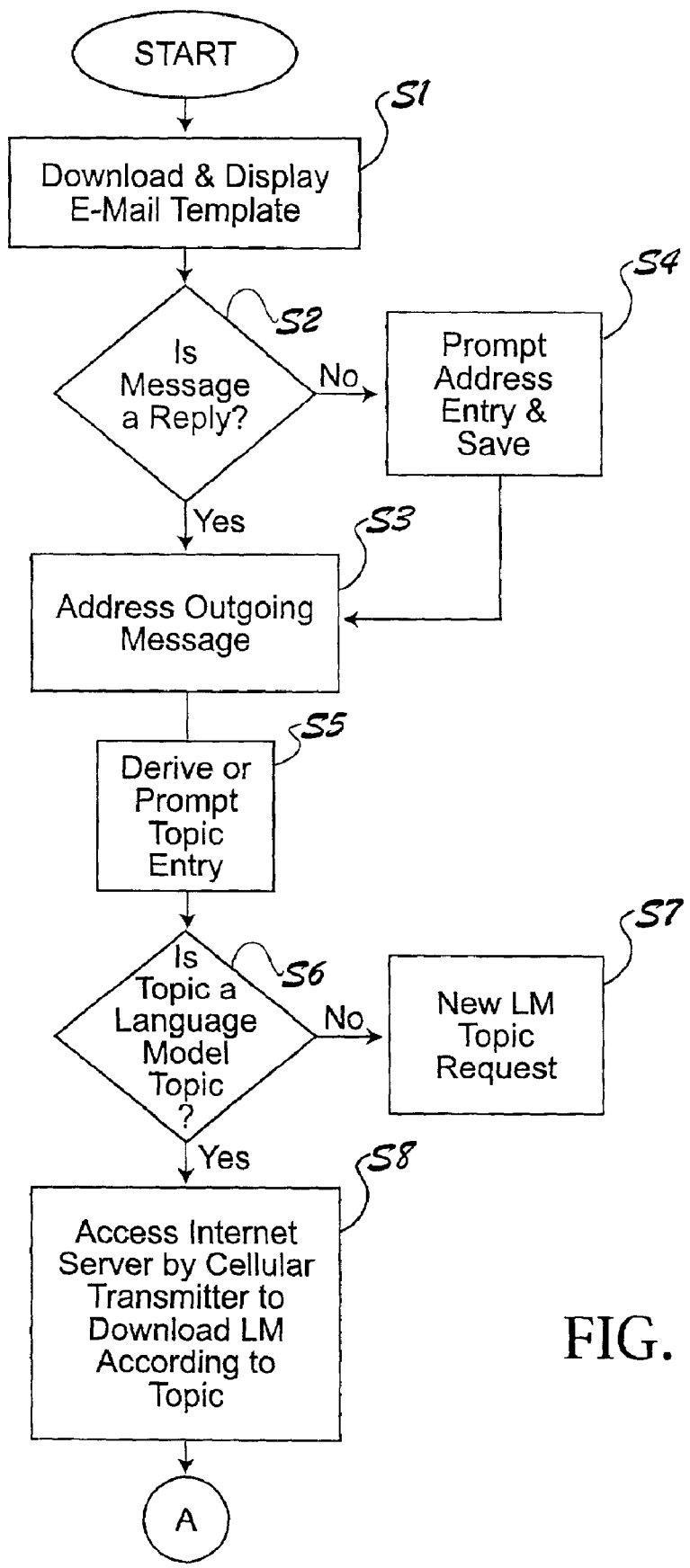
FIGS. 5A and 5B are a flowchart illustrating the operation principles of the e-mail processor according to the principles of the present invention.
Figure 5B:
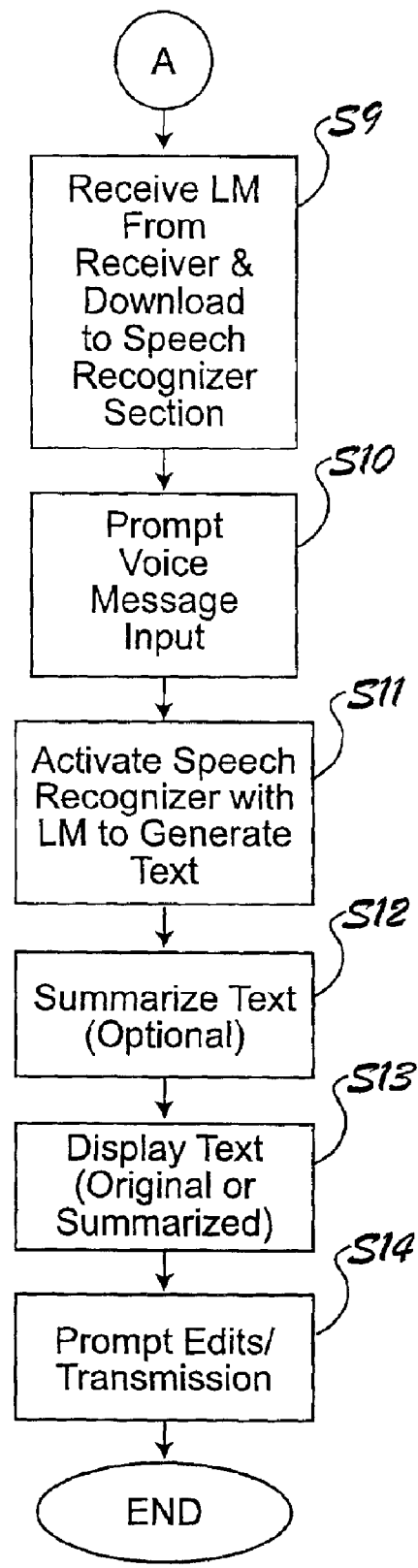

Given the above detailed description of the e-mail message module 50, a detailed description of the operation of the e-mail messaging system for personal digital assistants will now be described with reference to FIGS. 5A and 5B. Once the e-mail message module 50 of the computer system 18 is activated, the CPU 30 downloads, from ROM 32, the e-mail template which is then displayed on the display screen 14. The e-mail message module 50 then determines whether the message being prepared is a reply message at step S2, and if so, proceeds to step S3 for addressing the outgoing message utilizing the e-mail address of the sender of the previous message. If it is determined that the message is not a reply message at step S2, the user is prompted to enter the address of the intended receiver of the e-mail message at step S4 and the entered address is utilized at step S3 for addressing the outgoing message.

At step S5, if it is a "reply" e-mail message, the topic is derived from the received message. Otherwise, the user may be prompted to enter a topic for the e-mail message. The topic can be selected from a prestored menu or entered as a new topic, such as by keyword entry, utilizing known manual text entry techniques which have been utilized with previous personal digital assistants. At step S6, it is determined whether the entered topic is an existing language model topic. If the topic is not an existing language model topic, step S7 generates a new topic language model generation request. At step S8, the language model Internet server 56 is accessed by the language model retrieval section 54 by the cellular transmitter 22a and a request is provided in order to download an existing focused language model or to provide a request to generate a new focused language model for a topic which does not have an existing language model. At step S9 in FIG. 5B, the language model is received by the cellular receiver 22b and is then downloaded to the speech recognizer section 60 of the e-mail message module 50.

At step S10, a user is prompted to input a voice message which is input via the microphone 24 and stored in RAM 34. The speech recognizer section 60 is then activated at step S11 to convert the input speech message to text using the focused language model that was received from the language model Internet server 56. The generated text can then be optionally summarized (Step S12) by the text summarizer section 62 in order to reduce the amount of text to be displayed on the limited text display screen 14 at step S13. At step S14, the user is prompted to provide edits to the generated text and/or to transmit the e-mail message. Once transmission is selected, the transmission section 66 of the e-mail message module 50 is employed to provide a cellular connection to an Internet e-mail server 68 to transmit the e-mail message to the receiving e-mail server 70.

Figure 6:
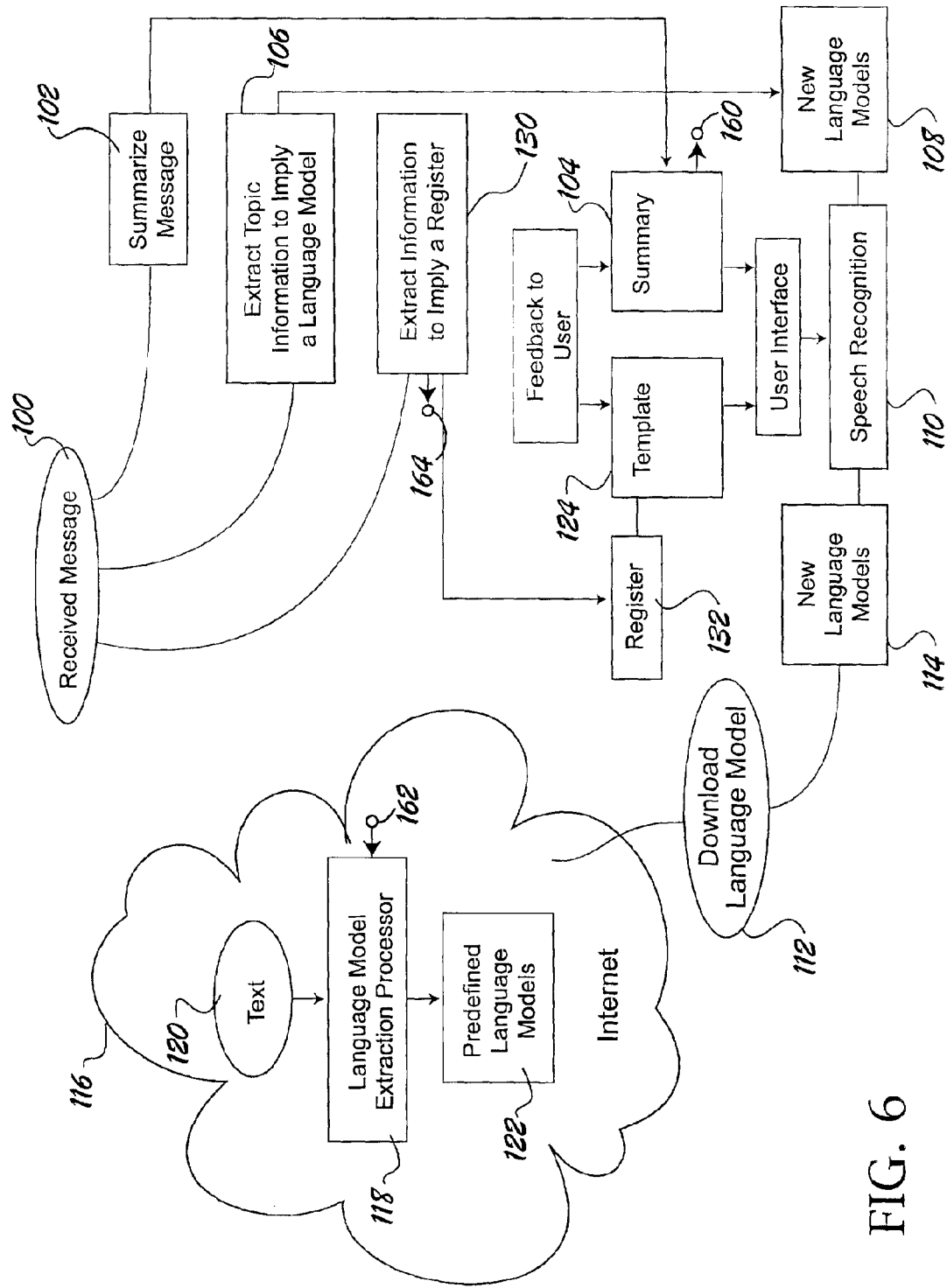
FIG. 6 is a data flow diagram useful in understanding the principles of the invention.

The invention provides a natural, easy to use interface through which the user of a handheld device can review and generate e-mail and instant messages. FIG. 6 summarizes some of the beneficial features of the invention. Referring to FIG. 6, the system extracts a number of useful components of information from the received message 100. The received message is processed by a summarizing module 102 that populates the Summary data store 104. The system also extracts the topic of the message, via the topic extraction module 106, and that extracted topic is used to access one of a set of prestored language models 108. The speech recognition module 110 uses the selected language model to increase the speed and improve the accuracy of the recognition process.

Because the number of available language models may be limited in some devices, the system also includes a language model downloading process that populates a new language model data store 114 based on information obtained from the internet 116. The extracted topic and/or the prestored language model is used by process 112 to identify a richer language model to be used when the user dictates a reply to the received message 100. While there are many ways to obtain suitable language models, a presently preferred solution is to employ a language model extraction processor which analyzes text 120 that may be found on various text sites throughout the internet. The language model extraction processor 118 can perform the model extraction process in response to requests from client applications (requests from user's handheld devices), or it can perform the model extraction process in advance. In one embodiment, the language model extraction processor 118 constantly downloads text 120 and dynamically creates new language models when enough data are available. Thus, the definition of language models may be dynamic. As may be readily appreciate by one skilled in the art, this is closely related to unsupervised clustering, so that soft clustering and automatic clustering generation, for example, may be applied at this level. Copies of the extracted language models may be stored, as at 122, for serving to a client application in response to a request from that device's download language model process 112.

The system stores a plurality of display and message generation templates 124 that are used to format the received message 100, or the summarized message 102. The templates are also used to format reply messages when the user dictates them. Although not required, the system default is such that the template of the received message is used when formatting the reply message. Thus, if the received message was in a standard American English letter format (Dear Mr. Jones . . . , Sincerely yours, . . . ), then the reply template will also default to that format. The user can change templates by menu selection or voice selection.

In one embodiment, the user enters text in the template that helps the speech recognition module 110 specialize its prior knowledge. It is possible that a particular message will have multiple language models applied, so that a preamble, for example, will have a different language model than a conclusion.

Another aspect of the invention involves extraction of a "register" attribute associated with the received message 100. This is performed by module 130, which populates a register data store 132. The register attribute is used to infer the tone or style of the received message and the associated reply. If the received message is formal in nature, then the template used for the reply will be similarly formal. If the received message is casual (such as an instant message or chat message), then a less formal reply is used. The system determines the register attribute by examining both the information used to infer the language model and the metadata describing how the received message was formatted. Extraction of the topic information, from which the language model is inferred, has been discussed above. The metadata associated with the letter, such as what words are used in the greeting or salutation, and in the complementary closing are used to infer whether the received message is formal, informal, casual, or the like. In the preferred embodiment, the extraction module 130 uses a set of IF-THEN rules to infer register.

In one embodiment, the Summary data store 104 may send information as at 160 to the language model extraction processor 118 as at 162 to permit tailoring of a language model for the user. This embodiment also permits the language model extraction processor 118 to know which language models are more popular. Similar, and for the same reasons, information concerning an extracted "register" attribute may be communicated from module 130 as at 164 to the language model extraction processor 118 as at 162.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A speech recognition processor for processing input speech and converting to text, comprising:
   topic determination means for determining a topic of the input speech;
   register determination means for determining a register of an outgoing message based on a user-specified register, wherein said register determining means is one or more of a keypad user interface device, a touch-based user interface device, and a speech recognition interface device that allows a user to input said register;
   speech input means for allowing a user to input a speech message;
   a language model retrieval section for retrieving a focused language model based upon said topic and said register;
   a speech recognition module which uses said retrieved focused language model to convert said speech message to text; and
   a display section for displaying said text.

2. The speech recognition processor according to claim 1, wherein said topic determination means is a keypad user interface device that allows a user to input said topic.

3. The speech recognition processor according to claim 1, wherein said topic determination means is a speech recognition interface device that allows a user to verbally input said topic.

4. The speech recognition processor according to claim 1, wherein said topic determination means derives said topic from a prestored text message.

5. The speech recognition processor according to claim 1, wherein said language model retrieval section accesses a server via an internet connection to retrieve said language model.

6. The speech recognition processor according to claim 5, wherein said language model retrieval section accesses said server via a wireless connection.

7. The speech recognition processor according to claim 1, further comprising a text summarizing section for summarizing said text.

8. The speech recognition processor according to claim 1, wherein said display section uses an e-mail template for displaying said text.

9. The speech recognition processor of claim 1, further comprising a language model extraction processor receiving information concerning an extracted register attribute and tailoring a language model according to the extracted register attribute.

10. A personal digital computer device, comprising:
   a housing including a display screen and an input keypad disposed on an outer surface thereof;
   a microphone unit disposed in said housing;
   a transmitter/receiver device disposed in said housing;
   a processor for processing input speech, including topic determining means for determining a topic of the input speech, register determination means for determining a register of an outgoing message based on a user-specified register, speech input means for allowing a user to input a voice message via said microphone, a language model retrieval section adapted for accessing an internet server via said transmitter/receiver device for retrieving a language model from the internet server based upon said topic and said register, a speech recognition module which uses said retrieved language model to convert said speech message to text, and a display section for displaying said text on said display screen,
   wherein said register determining means is one or more of a keypad user interface device, a touch-based user interface device, and a speech recognition interface device that allows a user to input said register.

11. The personal digital computer device according to claim 10, wherein said topic determining means is at least one of a keypad user interface device that allows a user to input said topic.

12. The personal digital computer device according to claim 10, wherein said topic determining means is a speech recognition interface device that allows a user to input said topic.

13. The personal digital computer device according to claim 10, wherein said topic determining means derives said topic from a prestored text message.

14. The personal digital computer device according to claim 10, wherein said language model retrieval section accesses said server via a wireless connection.

15. The personal digital computer device according to claim 10, wherein said processor includes a text summarizing section for summarizing said text.

16. The personal digital computer device according to claim 10, wherein said display section uses an e-mail template for displaying said text.

17. The personal digital computer device of claim 10, further comprising a language model extraction processor receiving information concerning an extracted register attribute and tailoring a language model according to the extracted register attribute.

18. A personal computer implemented speech recognition e-mail processor, comprising:

topic determining means for determining a topic of an outgoing e-mail message;

register determination means for determining a register of an outgoing message based on a user-specified register, wherein said register determining means is one or more of a keypad user interface device, a touch-based user interface device, and a speech recognition interface device that allows a user to input said register;

speech input means for allowing a user to input a voice message;

a language model retrieval section for retrieving a language model based upon said topic and said register;

a speech recognition section which uses said retrieved language model to convert said voice message to text;

a display section for displaying said text in an e-mail template; and a transmission section for transmitting said e-mail template via a cellular-internet connection.

19. The personal computer implemented speech recognition e-mail processor according to claim 18, wherein said topic determining means is a keypad user interface device that allows a user to input said topic.

20. The personal computer implemented speech recognition e-mail processor according to claim 18, wherein said topic determining means is a speech recognition interface device that allows a user to input said topic.

21. The personal computer implemented speech recognition e-mail processor according to claim 18, wherein said topic determining means derives said topic from a received e-mail message.

22. The personal computer implemented speech recognition e-mail processor according to claim 18, wherein said language model retrieval section accesses said server via a cellular phone connection.

23. The personal computer implemented speech recognition e-mail processor according to claim 18, wherein said processor includes a text summarizing section for summarizing said text.

24. The personal computer implemented speech recognition e-mail processor of claim 18, further comprising a language model extraction processor receiving information concerning an extracted register attribute and tailoring a language model according to the extracted register attribute.

25. A personal computer implemented speech recognition e-mail processor, comprising:

register determining means for determining a register of an outgoing e-mail message based on a user-specified register;

register inferred for an outgoing message replying to a received message based on one or more of: (a) metadata describing how the received message was formatted, and (b) forms of address present in the received message;

speech input means for allowing a user to input a speech message;

a language model retrieval section for retrieving a language model based upon said register;

a speech recognition section which uses said retrieved language model to convert said speech message to text;

a display section for displaying said text in an e-mail template; and a transmission section for transmitting said e-mail template via a cellular-internet connection, wherein said register determining means is one or more of a keypad user interface device and a touch-based user interface device that allows a user to input said register.

26. The personal computer implemented speech recognition e-mail processor according to claim 25, wherein said language model retrieval section accesses said server via a cellular phone connection.

27. The personal computer implemented speech recognition e-mail processor according claim 25, wherein said processor includes a text summarizing section for summarizing said text.

28. The personal computer implemented speech recognition e-mail processor of claim 25, further comprising a language model extraction processor receiving information concerning an extracted register attribute and tailoring a language model according to the extracted register attribute.

29. A personal computer implemented speech recognition e-mail processor, comprising:

register determining means for determining a register of an outgoing e-mail message based on a user-specified register;

register inferred for an outgoing message replying to a received message based on one or more of: (a) metadata describing how the received message was formatted, and (b) forms of address present in the received message;

speech input means for allowing a user to input a speech message;

a language model retrieval section for retrieving a language model based upon said register;

a speech recognition section which uses said retrieved language model to convert said speech message to text;

a display section for displaying said text in an e-mail template; and a transmission section for transmitting said e-mail template via a cellular-internet connection, wherein said register determining means is a speech recognition interface device that allows a user to input said register.

30. The personal computer implemented speech recognition e-mail processor according to claim 29, wherein said language model retrieval section accesses said server via a cellular phone connection.

31. The personal computer implemented speech recognition e-mail processor according to claim 29, wherein said processor includes a text summarizing section for summarizing said text.

32. The personal computer implemented speech recognition e-mail processor of claim 29, further comprising a language model extraction processor receiving information concerning an extracted register attribute and tailoring a language model according to the extracted register attribute.

* * * * *

UNITED STATES PATENT AND TRADEMARK OFFICE
CERTIFICATE OF CORRECTION

PATENT NO. : 6,901,364 B2  Page 1 of 1
APPLICATION NO. : 09/951093
DATED : May 31, 2005
INVENTOR(S) : Nguyen et al.

It is certified that error appears in the above-identified patent and that said Letters Patent is hereby corrected as shown below:

Column 10, Line 1, Claim 25:
    Delete "speech" and insert --voice--

Column 10, Line 7, Claim 25:
    Delete "speech" and insert --voice--

Column 10, Line 39, Claim 29:
    Delete "speech" and insert --voice--

Column 10, Line 44, Claim 29:
    Delete "speech" and insert --voice--

Signed and Sealed this

First Day of July, 2008

JON W. DUDAS
*Director of the United States Patent and Trademark Office*